Jan. 26, 1965　　　　P. RENAUT ETAL　　　　3,166,931
ULTRASONIC INSPECTION APPARATUS USING SHORT ELASTIC PULSES
Filed Nov. 15, 1956　　　　　　　　　　　　　　2 Sheets-Sheet 1

Inventors
Paul Renaut
Jacques Dory
by Michael J. Striker

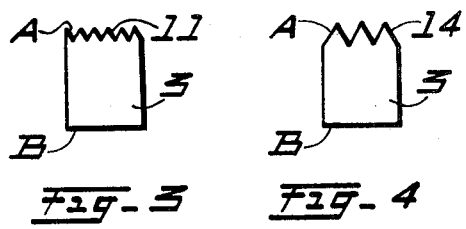
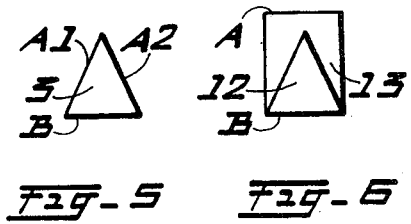
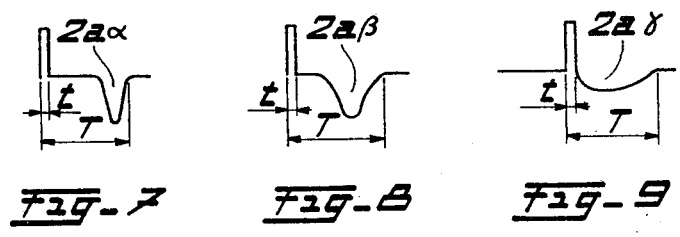

3,166,931
ULTRASONIC INSPECTION APPARATUS USING SHORT ELASTIC PULSES
Paul Renaut and Jacques Dory, both of 9 Ave. des Sapins, Saint-Maur, France
Filed Nov. 15, 1956, Ser. No. 622,415
Claims priority, application France, Nov. 26, 1955, 703,378
12 Claims. (Cl. 73—67.8)

The invention relates to inspection systems for measuring the thickness of solid parts or for locating defects inside said parts, by means of elastic vibrations.

It more particularly concerns inspecting systems in which short elastic pulses are transmitted to the part to be examined by means of an electro-mechanical transducer and produce echoes by reflection from the bottom of the part or the defects to be located. In these systems, the transmitted pulses and reflected echoes are for instance displayed on the screen of a cathode ray tube, and the position of the echoes with respect to that of the transmitted pulses enables one to measure the distance from the transmitting face of the transducer to the reflecting surface, while the shape of the echoes supplies information relative to the nature and shape of the reflecting surfaces. Of course, various other methods for displaying the echoes or measuring their propagation time and the various parameters which define said echoes may be substituted for the cathode ray tube without departing from the spirit of these well-known methods for testing objects by means of recurrent elastic pulses.

It may be noted that these methods have been used until now for examining parts of comparatively great thickness, and, in any case, at least about one centimetre thick. The word "thickness" relates, in this specification and the appended claims, to that dimension of the test body which is perpendicular to the transmitting surface of the transducer, i.e. parallel to the direction of propagation of the elastic vibrations inside the body. The elastic pulses are generally generated from electric pulses produced by cutting up, at an audio frequency rate, for instance 1000 c./s., a radio frequency sine wave. Each pulse includes several cycles or oscillations of the radio frequency sine wave, and, for instance, if the radio frequency is 5 mc./s., and if each pulse includes ten complete oscillations, each cycle having a duration $\tau$ equal to $\frac{1}{5}$ $\mu$s., the duration $t$ of the pulse is 2 $\mu$s. The transducer is, for instance, a quartz crystal, a ceramic, or other piezo-electric unit having a natural resonant period T, which is selected equal to $\tau$, so as to cause the transducer to vibrate at its resonance. The transducer resonant period T being related to its thickness $e$, defined in the same way as that of the part, by the formula:

$$T = \frac{e}{V}$$

if the propagation velocity $v$ of the elastic vibrations through the transducer is equal for instance to 5,000 m./s., and if $T = \tau = \frac{1}{5}$ $\mu$s., one will have:

$$e = v.T = 0.1 \text{ cm.}$$

The above example shows that the testing operation is generally carried out with transducers having a thickness comparatively small with respect to that of the test body. For testing very thin bodies, one will be induced, according to these methods, to decrease the period $\tau$ and, consequently, to use very thin ceramics having high natural frequencies. However one is limited in this way by the brittleness of the ceramic and the spurious reflections which then take place in the crystalline structure of the test body.

If one reduces the pulse duration $t$ by decreasing the number of oscillations comprised therein, the following difficulty arises: it is well known that a short electric pulse generates, in a transducer, a series of damped elastic vibrations having a duration equal to the damping period of the transducer. If such a pulse is applied to a transducer in contact with a test body there appears, on the screen of the cathode ray tube, a train of damped vibrations and of echoes obtained from reflection of said damped vibrations inside the part. It is practically necessary, in order that observation of the echoes be possible, that the first echo displayed on the screen be received after transmission of the last damped vibration of the train. As the moment when this first echo is received depends upon the distance to the reflecting surface, this distance must remain sufficient so that the first echo be received only after the end of the damping period of the transducer; it has been endeavoured to make this period as short as possible, however said period remains at least equal for instance to the duration of five radio-frequency oscillations.

Finally, in the above described methods, one cannot reduce the pulse duration $t$ to a value lower than this damping period: generally $t$ is made equal to this damping period, and besides the pulse, i.e. the envelope of the radio-frequency oscillations, is given a shape corresponding to that of the damping response curve of the transducer.

It is an object of this invention to provide an improved inspection system of the above described general type.

The inspection system according to the invention is characterized by the use of "mono-oscillation" elastic pulses, as opposed to the elastic pulses used in the above described methods which are formed by interrupting a radio-frequency carrier wave, the duration $t$ of said "mono-oscillation" pulses being shorter than the natural resonant period T of the transducer, instead of being longer, as it is in prior art systems.

The above defined pulses will be referred to as "mono-oscillation" pulses in this specification and the appended claims.

According to the invention the ratio $T/t$ is sufficient for the time interval $T-t$ to be larger than the time interval between the transmitted pulse and receipt of the first echo.

According to another aspect of the invention, the ratio $T/t$ is at least equal to 3: preferably said ratio will be at least equal to 10.

According to a preferred embodiment which is particularly convenient for testing bodies having a small thickness (for instance, smaller than one cm.), there is used an electro-mechanical transducer having a thickness $e$ comparatively large with respect to the thickness $d$ of the tested body (in the present specification, $d$ generally designates the distance from the transmitting face of the transducer to a reflecting surface): more accurately the thickness $e$ is selected so that the inequality:

$$T = \frac{e}{v} > T' = \frac{2d}{v'}$$

be satisfied, where T' is the propagation time of the elastic vibrations from said transmitting face in contact with the test object to the reflecting obstacle and back to the transmitting face, and $v'$ their propagation velocity through the part.

In said preferred embodiment the sweep velocity is selected so that only the first echo obtained by reflection from the obstacle be observed on the screen of the cathode ray tube, said echo being located between a transmitted pulse and the first pulse of the damped train generated by said transmitted pulse. This damped train is comprised of successive pulses of decreasing amplitudes, such as $2a$, $2b$, $2c$, FIG. 2, when $t$ is substantially different from T.

According to a second embodiment, suitable for examination of comparatively thick parts (that is having a thickness greater than one cm., for instance), the thickness $e$ is selected so that the inequality:

$$\frac{e}{v} < \frac{2d}{v'}$$

be satisfied, and the damped pulses generated by a transmitted pulse are used as marking signals for the echoes.

According to a modification of this second embodiment, said damped pulses are eliminated by cutting, in the face of the transducer opposite to the transmitting face, grooves hollow enough for providing that said damped pulses be replaced by a component of audio-frequency current, having a frequency of the order of $1/T$. Said component, which appears across the terminals of the transducer, is suppressed by means of a high pass filter. In the two above embodiments, the repetition period of the electric pulses which energize the transducer is longer than the damping period of the transducer, the latter period being a multiple of T.

According to a third embodiment, said energizing pulses are synchronized with the successive damped pulses which have a recurring period equal to T, and with the period of the sweep voltage.

According to a fourth embodiment, the transducer is energized by electric rectangular signals of duration $t$ short relative to T.

The invention will be more clearly understood from the description given hereinafter and the appended drawings in which:

FIG. 1 diagrammatically shows an inspection device according to the invention.

FIGS. 3-6 illustrate various types of transducers which may be used in the above mentioned modification of the second embodiment of the invention.

FIGS. 7-11 show graphs illustrating the operation of various embodiments of the invention.

Figure 1:
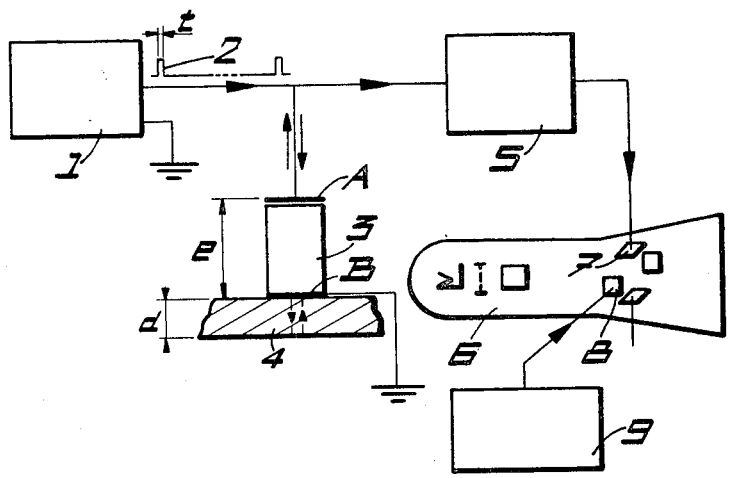

In FIGURE 1, generator 1 produces recurrent short electric "mono-oscillation" pulses 2, having a duration $t$ of the order of ½ μs. for instance (this value, as well as any value mentioned hereinafter, is by no way limiting). The recurring period of said pulses is for instance 1,200 μs. They energize a ceramic transducer 3 consisting, for instance, of a piezo-electric ceramic having a thickness $e=3$ cm. laid upon the part 4 to be examined; B is the transmitting face in contact with the test part, A being the opposite face of transducer 3. The echoes obtained by reflection from the bottom of the part 4 are transmitted, through a video amplifying device 5, to the vertical deflection plates 7 of a conventional cathode ray tube 6, the horizontal deflection plates 8 of which are fed by a sweep generator 9, the period of the sweep voltage, in the example described, being equal to 6 μs.

The operation of this device is the following: when the first pulse 2 delivered by generator 1 is applied across the terminals of transducer 3, both faces A and B are subjected to an elastic vibration, the velocity of motion of said faces being nil at the end of pulse 2 (that is after a time equal to ½ μs. has collapsed). The elastic pulses thus generated in A and B travel through the transducer at a speed $v$ during a time $$T = \frac{e}{v}$$

Figure 2:
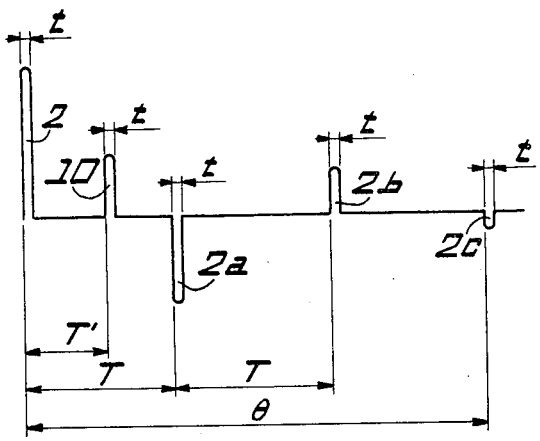
FIG. 2 shows an oscillogram obtained with the apparatus of FIG. 1.

(which, with the above assumed values, and for $v=5,000$ m./s., equals 6 μs.: thus, in this example, $T/t=12$). It can be shown that, during this period T, no electric voltage appears across the terminals of the transducer. However, at the end of the period T, the elastic pulse coming from A and reaching B generates an electric pulse $2a$ having a duration $t$, a sign opposite to that of pulse 2 and a lower amplitude. Finally, under the action of electric pulse 2, a train of damped electric pulses $2a$, $2b$, $2c$, are generated, having decreasing amplitudes, and the overall duration $\theta$ of which defines the damping period of the transducer, which may be equal to 18 μs. for instance (FIG. 2). Furthermore, the elastic pulse produced at B penetrates into part 4 and travels therethrough down to its bottom, and after reflection from that bottom (or from a flaw inside the part) travels back ot B. The propagation time of the latter pulse is $$T' = \frac{2d}{v'}$$

In the example described, assuming that $v'=v=5000$ m./s., parts having a thickness smaller than 1.5 cm. can be examined. Therefore one will have: $T'<6$ μs., that is $T'<T$, and the first echo from the bottom 10 will be located between pulses 2 and $2a$. As it has been assumed that the sweep period of the cathode ray tube is 6 μs., that is equal to T, and as the recurring period of the pulses has been so selected as to be a multiple of T, echo 10 located between pulses 2 and $2a$ will permanently appear on the screen. Thus it may be seen that the thickness $e$ of the thinnest parts which may be examined is finally solely determined by the overlapping of echo 10 and pulse 2, which corresponds to a value of T' equal to about 2 or $3t$. Thus by sufficiently reducing $t$ it is practically possible to examine parts as thin as desired. For examination of parts thicker than 1.5 cm. it is still possible to use the device of FIG. 1, provided that the sweep velocity be suitably selected in order to cause several pulses 2, $2a$, $2b$, etc. to appear on the screen: then an echo 10, located between two pulses such as $2a$ and $2b$ for instance, can be observed on the screen, and pulses $2a$, $2b$, $2c$, etc., will achieve a marking enabling one to determine the time interval T'.

However, in the latter case, (that is for $T'>T$) it may be preferable to eliminate as far as possible the damped pulses $2a$, $2b$, etc. For that purpose it is generally sufficient to damp face A of the transducer by cutting grooves therein.

The effect of the grooves will now be explained with reference to FIGS. 3-6.

In FIG. 3 shallow grooves 11 have been shown, having a depth of 3 mm. for instance, in a ceramic transducer 3 which is 3 cm. thick; in FIG. 4 the grooves 14 have for instance a depth of 6 mm. In FIG. 5 there is shown in elevation a conical transducer 3, the conical surface of which bears two separate metallizations A1 and A2.

In the modification, shown in FIG. 6 a conical ceramic body 12 is fitted in a ceramic body 13 of complementary shape, the latter carrying a metallization A. In FIGS. 7 and 8 are shown the waveforms $2a\alpha$ and $2a\beta$ of the first damped pulse obtained when transducers of FIGS. 3 and 4, respectively, are energized with a short electric pulse 2. It can be seen that the amplitude of the damped pulse decreases as the depth of the grooves is increased, while the pulse width increases; in some way the pulses are flattened and thus, are more easily distinguished from the echoes.

In the borderline case of FIG. 9 which shows the waveform $2a\gamma$ of the first damped pulse obtained with the transducer of FIG. 5, the damped pulse is replaced by an audio-frequency undulation, which will be suppressed by means of a highpass filter.

FIGS. 10 and 11 illustrate the abovementioned fourth embodiment of the invention. In FIGURE 10, there has been shown a rectangular pulse 2 having a width $t$ equal to 1 μs. for instance, and the bottom echo 10D obtained in a sheet of "Plexiglas." In FIG. 11, it has been shown a rectangular pulse having the same width as the preceding one, and the echo 10I obtained by reflection from a small circular flaw. It may be seen that the two echoes obtained are easy to distinguish, the echo 10D having a shape which may be derived, through integration, from that of a rectangular pulse, while the shape of the echo 101 may be derived from that of a rectangular pulse through differentiation. The reason why the echo shapes are different may be explained as follows: "Plexiglas" (as well as various other plastic materials) behaves, with respect to elastic vibrations, as a low pass filter, and therefore a rectangular elastic pulse transmitted therethrough will be distorted by loss of its high frequency components. On the other hand, in the reflection of a rectangular elastic pulse from a small circular flaw in aluminum for instance, the latter behaves as a high pass filter, and modifies the shape of the pulse accordingly. The use, according to this embodiment, of "mono-oscillation" rectangular elastic pulses will be interesting for studying the nature of flaws or other reflecting surfaces existing inside the test object.

What we claim is:

1. A device for testing an object comprising means for transmitting into the test object recurrent elastic pulses; means for receiving the echoes resulting from back reflection of said pulses from said object; said transmitting means comprising a pulse generator producing recurrent mono-oscillation pulses each having a duration $t$, and a piezo-electric transducer having a transmitting face mounted in vibration transmitting relation to the test object and at least two conducting surfaces connected to said generator and at least one of which is substantially parallel to said transmitting face, the "thickness" of said transducer being substantially greater than the distance $d$ from the transmitting side of said transducer to any reflecting surface within the test object.

2. A device as claimed in claim 1, in which said piezo-electric transducer has a side opposite to said transmitting face and provided with grooves.

3. A device as claimed in claim 1, further comprising a cathode ray tube connected to said receiving means for displaying said echoes; said cathode ray tube comprising: a screen and first and second screen sweeping means; means for repeatedly causing said first sweeping means to scan said screen in synchronism with said pulse generator, said second sweeping means being coupled to said one surface for receiving signals therefrom.

4. An apparatus for non-destructive ultrasonic testing, comprising: means for transmitting into the test object recurrent elastic mono-oscillation pulses, whereby echoes are produced by reflection of said pulses from said object and means for receiving said echoes; said transmitting means comprising a piezo-electric transducer coupled to a substantially plane surface of the test object and having two conducting surfaces, one of said surfaces being substantially parallel to said plane surface of the test object conducting surface, means for generating electric mono-oscillation pulses each having a duration $t$ substantially shorter than the natural period of resonance $T$ of said transducer, said generating means being coupled to said conducting surfaces.

5. An apparatus for non-destructive ultrasonic testing, comprising: means for transmitting into the test object recurrent elastic mono-oscillation pulses, whereby echoes are produced by reflection of said pulses from said object and means for receiving said echoes; said transmitting means comprising a transducer coupled to the test object along a contact surface and having at least one electrode substantially plane and parallel to said contact surface and, connected to said transducer, means for generating trains of electric mono-oscillation pulses each having a duration $t$; the difference $(T-t)$ between the natural period of resonance $T$ of said transducer and said duration $t$ being greater than the time interval between the transmitted pulse and receipt of the first echo.

6. An apparatus according to claim 4, in which $T/t$ is superior to three.

7. An apparatus according to claim 4, in which $T/t$ is superior to ten.

8. An apparatus according to claim 4, in which T is substantially higher than the out and back propagation time T' of the elastic pulses within the test object.

9. An apparatus according to claim 4, in which the out and back propagation time T' of the elastic pulses within the test object is comprised between T and the damping period $\theta$ of the transducer.

10. An apparatus according to claim 4, in which said mono-oscillation pulses are rectangular pulses.

11. An apparatus for non-destructive ultrasonic testing, comprising means for transmitting into the test object recurrent elastic mono-oscilaltion pulses, whereby echoes are produced by reflection of said pulses from said object and means for receiving said echoes; said transmitting means comprising a transducer coupled to a substantially plane surface of the test object and having two conducting surfaces, one of said surfaces being substantially parallel to said plane surface of the test object, means for generating electric mono-oscillation pulses each having a duration $t$ substantially shorter than the natural period of resonance T of said transducer, said generating means being connected across said conducting surfaces, each of said electric pulses exciting, in said transducer, a train of damped elastic pulses, said receiving means comprising a video-frequency amplifier for amplifying said trains of damped elastic pulses and the echoes comprised between the successive pulses of said trains and means for selectively displaying said damped trains and said echoes.

12. Apparatus for making ultrasonic measurements in thin laminae of test specimens, comprising a piezoelectric, electromechanical transducer having a pair of surfaces spaced from one another a longitudinal distance to exhibit an acoustic transit time at least twice the transit time in a lamina undergoing measurement, one of said surfaces being adapted to be coupled acoustically to a test specimen, said transducer having a lateral dimension at least of the order of magnitude of its longitudinal dimension, means for generating at least one discrete electrical impulse of duration much shorter than the transit time in said lamina, means connecting the generating means to said surfaces to generate an acoutic signal emanating from said one surface and entering the test specimen to derive one reflected wave front by propagation through said lamina, said one wave front intervening temporally between successive other wave fronts generated by said impulse, and means responsive to the energy in said one reflected wave front for detecting and manifesting said one wave front returned from within the lamina, whereby such manifestation is clearly distinguishable from the effects of the other wave fronts generated by said impulse.

References Cited in the file of this patent

UNITED STATES PATENTS

| 2,280,226 | Firestone | Apr. 21, 1942 |
| 2,888,824 | Henry | June 2, 1959 |

FOREIGN PATENTS

| 899,643 | France | Aug. 28, 1944 |
| 1,063,331 | France | Dec. 16, 1953 |
| 638,285 | Great Britain | June 7, 1950 |
| 715,143 | Great Britain | Sept. 8, 1954 |